United States Patent
Jain et al.

(10) Patent No.: US 11,521,116 B2
(45) Date of Patent: Dec. 6, 2022

(54) SELF-OPTIMIZING MULTI-CORE INTEGRATED CIRCUIT

(71) Applicant: NXP USA, INC., Austin, TX (US)

(72) Inventors: Diviya Jain, New Delhi (IN); Ashish Mathur, New Delhi (IN)

(73) Assignee: NXP USA, Inc., Austin, TX (US)

( * ) Notice: Subject to any disclaimer, the term of this patent is extended or adjusted under 35 U.S.C. 154(b) by 426 days.

(21) Appl. No.: 16/452,443

(22) Filed: Jun. 25, 2019

(65) Prior Publication Data

US 2020/0410389 A1  Dec. 31, 2020

(51) Int. Cl.
*G06N 20/00* (2019.01)
*G06F 9/445* (2018.01)

(52) U.S. Cl.
CPC ......... *G06N 20/00* (2019.01); *G06F 9/44505* (2013.01)

(58) Field of Classification Search
CPC .................................................... G06N 20/00
USPC ......................................................... 706/12
See application file for complete search history.

(56) References Cited

U.S. PATENT DOCUMENTS

| | | | |
|---|---|---|---|
| 7,146,607 B2 | 12/2006 | Nair et al. | |
| 8,965,819 B2 | 2/2015 | Tirunagari | |
| 9,792,397 B1 | 10/2017 | Nagaraja | |
| 2005/0166207 A1 | 7/2005 | Baba et al. | |
| 2011/0119212 A1* | 5/2011 | De Bruin | G16H 50/70 |
| | | | 706/12 |
| 2018/0181877 A1* | 6/2018 | Wu | G06N 20/00 |
| 2019/0200872 A1* | 7/2019 | Matsuoka | A61B 5/0013 |
| 2019/0340489 A1* | 11/2019 | Mills | G06N 3/08 |
| 2020/0145920 A1* | 5/2020 | Shen | H04W 52/0229 |
| 2020/0183482 A1* | 6/2020 | Sebot | G06F 1/3228 |
| 2020/0342350 A1* | 10/2020 | Madar, III | G06N 3/063 |

OTHER PUBLICATIONS

Rahul Jain et al., "A Coordinated Multi-Agent Reinforcement Learning Approach to Multi-Level Cache Co-partitioning", 2017 Design, Automation and Test in Europe, 2017, pp. 800-805.
Shankar Sadasivam, Zhuo Chen, Jinwon Lee, And Rajeev Jain, "Invited: Efficient Reinforcement Learning for Automating Human Decision-Making in SoC Design", DAC '18:The 55th Annual Design Automation Conference 2018, Jun. 24-29, 2018, San Francisco, CA, USA, 2018. (https://doi.org/10.1145/3195970.3199855).
Engin Ipek et al,. "Self-Optimizing Memory Controllers: A Reinforcement Learning Approach", 2008 International Symposium on Computer Architecture, Jun. 21-25, 2008.
Sebastian Kobbe, Lars Bauer, Daniel Lohmann, Wolfgang Schröder-Preikschat, and Jörg Henkel, "DistRM: Distributed Resource Management for On-Chip Many-Core Systems", CODES+ISS 11, Oct. 14, 2011, Taipei, Taiwan. Copyright 2011 ACM 978-1-4503-0715—Apr. 11, 2010.

* cited by examiner

*Primary Examiner* — Ruay Ho

(57) ABSTRACT

A self-optimizing System-on-Chip (SOC) includes multiple cores, multiple hardware accelerators, multiple memories and an interconnect framework. The SOC also includes a machine learning (ML) module that uses data flow information to build a ML network dynamically and configures all the various hardware blocks autonomously, to achieve predetermined application performance targets. The SOC is able to recover from hangs caused when testing various configuration settings. The SOC also avoids configuration settings that cause severe drops in performance.

13 Claims, 6 Drawing Sheets

SELF-OPTIMIZING MULTI-CORE INTEGRATED CIRCUIT

BACKGROUND

The present invention relates to multi-core integrated circuits and, more particularly, to a System on a Chip (SOC) that uses machine learning (ML) technology to configure its internal hardware blocks to achieve a predetermined performance level.

SOCs are complex integrated circuits that include multiple cores, multiple hardware accelerators, multiple memories, and a hierarchical interconnection framework. Each SOC processing/communication block has various runtime configurations that can be tweaked to optimize application performance while reducing power or conforming to latency constraints.

Typically, default configurations are used for all applications, which leads to sub-optimal performance. However, the number of variables (configuration settings) is too large and the interactions between the hardware modules so complex, that it is not feasible for a software developer to be able to set the parameters for each module in order to maximize performance.

Accordingly, it would be advantageous to have a method of configuring an SOC to meet desired application performance/latency/power targets in an autonomous way, without any a priori knowledge of performance implications of different configuration settings.

SUMMARY

This summary is provided to introduce a selection of concepts in a simplified form that are further described below in the Detailed Description. This summary is not intended to be relied on to identify key features or essential features of the claimed subject matter, nor is it intended to be used to limit the scope of the claimed subject matter.

In one embodiment, the present invention provides a self-optimizing System on a Chip (SOC), where the SOC includes multiple cores, multiple hardware accelerators, multiple memories, and an interconnection framework that couples the cores, the accelerators and the memories to permit programs to be executed by the SOC. The SOC further includes a SOC reset controller, a machine learning (ML) module, a reset timer and a pathological configuration list. The SOC reset controller is configured to reset the SOC. The ML module adjusts configuration parameters of the cores, the hardware accelerators, interconnect elements and the memories autonomously until a desired performance target is achieved. The ML module adjusts the configuration parameters to meet the desired performance target by tuning the configuration parameters and autonomously cycling through configuration training sequences until the desired performance target is achieved. The ML module uses two different mechanisms to tune configuration parameters. For those configuration parameters that can be set only during SoC reset, the ML module communicates with the SOC reset controller to issue a reset and override the standard configuration parameters. For other configuration parameters, where SOC reset is not a necessity, the ML module uses a synchronization protocol so that all the cores and hardware accelerators achieve a quiescent state before configuration changes are pushed thereto. During the synchronization protocol, the reset timer measures execution times of the configuration updates and communicates with the SoC reset controller to issue a reset if the execution time exceeds a predetermined time value. The pathological configuration list, which is generated by the ML module, comprises a list of configuration settings that lead to severe performance drops by classifying performance drops below a predetermined threshold value as pathological. The ML module checks if new configuration parameters match a configuration setting in the pathological configuration list and if there is a match, then the ML module does not use the configuration parameters, but instead generates a new set of configuration parameters.

In another embodiment, the present invention provides a method of optimizing a SOC having multiple cores, multiple hardware accelerators, multiple memories and an interconnection framework therefor. The method includes setting a desired performance target for the SOC, executing a performance test on the SOC, and measuring the performance of the SOC as determined by an iteration of the performance test against the desired performance target. When the measured performance does not meet the desired performance target, a Machine Learning (ML) module is enabled that uses workload dataflow information to build or select a ML network and configures the SOC to meet the desired performance target by tuning configuration parameters of at least the cores, the accelerators, the interconnect and the memories by autonomously cycling through configuration training and/or exploiting sequences until the desired performance target is achieved. The ML module classifies performance drops below a predetermined performance threshold as pathological and saves the configuration parameters thereof to a pathological configuration list. Then configuration settings that lead to severe performance drops are avoided by the ML module checking if new configuration parameters match one of the configuration settings stored in the pathological configuration list. The method observes performance metrics and recovers from SOC configuration settings that lead to the severe performance drops or deadlock like conditions by applying reset.

In one embodiment, the ML module configures the SOC to meet the desired performance target by tuning configuration parameters of the SOC and autonomously cycling through SOC configuration training sequences until the desired performance target is achieved. The ML module avoids SOC configuration settings that lead to severe performance drops by classifying performance drops below a threshold as pathological, recording SOC configurations that lead to pathological performance drops in a pathological configuration list, and checking if new SOC configurations match one of the SOC configuration settings stored in the pathological configuration list. The ML module also allows the SOC to recover from configuration settings that lead to the SOC freezing by using a reset timer and initiating a reset if the reset timer expires. The initiated reset is a special reset, not a normal SOC reset, as the reset routine is updated to use configuration parameters specified by the ML module instead of the default configuration parameters used in the normal SOC reset.

In one embodiment, the method further comprises providing a protocol for synchronized updates to avoid undefined behaviors due to dynamic runtime configuration changes, confirmation of quiescent state asserted to ML module, collecting quiescent state confirmation before pushing configuration updates and providing a reset timer to issue SOC reset if a quiescent state is not attained within a predetermined time.

BRIEF DESCRIPTION OF THE DRAWINGS

So that the manner in which the above recited features of the present application can be understood in detail, a more particular description of the application, briefly summarized above, can be had by reference to embodiments, some of which are illustrated in the appended drawings. It is to be noted, however, that the appended drawings illustrate only typical embodiments of this application and are therefore not to be considered limiting of its scope, for the application can admit to other equally effective embodiments. The drawings are for facilitating an understanding of the application and thus are not necessarily drawn to scale. Advantages of the subject matter claimed will become apparent to those skilled in the art upon reading this description in conjunction with the accompanying drawings, in which like reference numerals have been used to designate like elements, and in which:

DETAILED DESCRIPTION

Contemporary SOCs are quite complex and heterogeneous and are typically designed to include multiple cores, multiple hardware accelerators, an interconnection framework, and multiple memories. In the present invention, the SOC further includes a machine learning (ML) module and a reset controller. The ML module is in communication with the multiple cores, accelerators, memories, the interconnection framework and the reset controller to adjust configuration parameters autonomously until a desired performance target is achieved.

Figure 1:
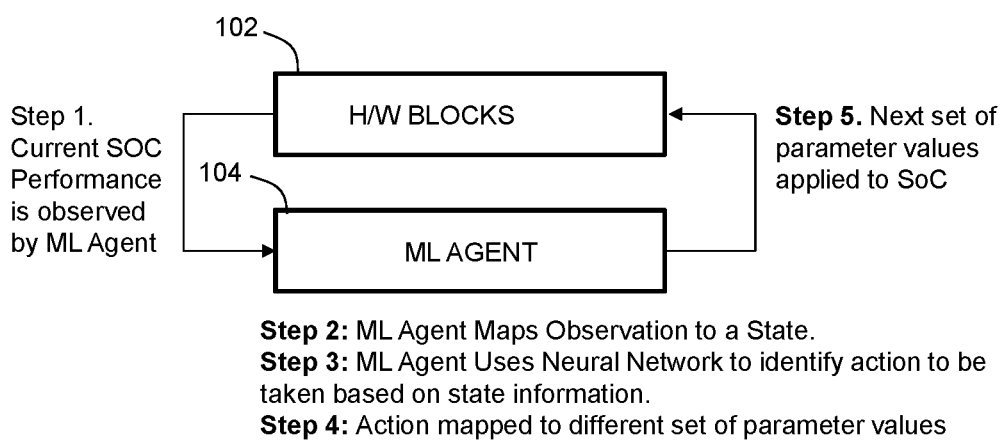
FIG. 1 is a simplified schematic block diagram of a SOC and a machine learning (ML) module in accordance with an embodiment of the present invention.

Referring now to FIG. 1, a simplified schematic block diagram of a SOC 100 including a plurality of hardware blocks 102 and a machine learning (ML) module or agent 104, in accordance with an embodiment of the present invention, is shown. The ML module 104 observes the performance of the hardware blocks 102 and maps an observation of the current performance to a state. Then the ML module 104 uses a neural network to identify an action to be taken based on the state and maps the action to be taken to a new set of parameter values for the hardware blocks 102. In one embodiment, the ML module 104 uses a Reinforcement Learning (RL) neural network. Finally, the new set of parameter values are applied to the hardware blocks 102. The process illustrated is continuous, with the performance of the hardware blocks 102 being observed and new sets of parameter values being applied to the hardware blocks 102.

Figure 2:
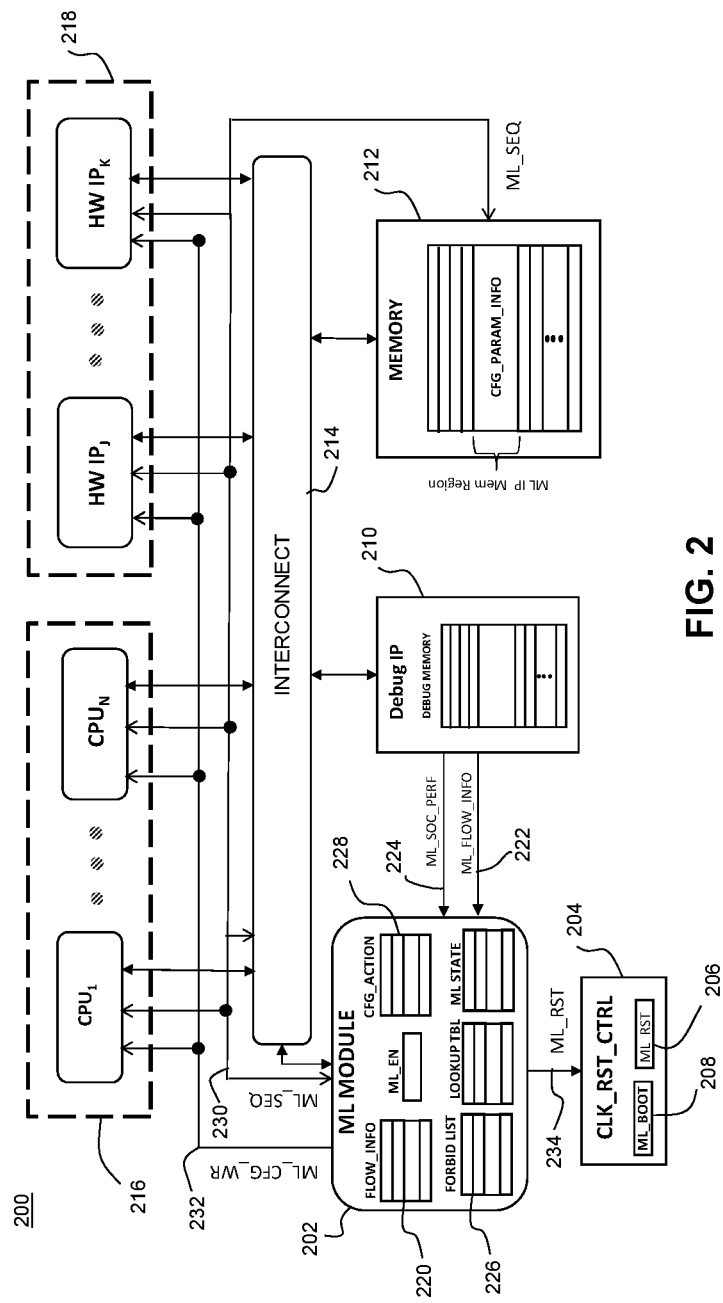
FIG. 2 is a schematic block diagram of a SOC in accordance with an embodiment of the present invention.

FIG. 2 is a schematic block diagram of a SOC 200 in accordance with an embodiment of the present invention. The SOC 200 includes a machine learning (ML) module 202, a reset controller 204, which includes a reset timer 206 and a ML boot module 208, a debug module 210, a memory 212, an interconnect framework 214, multiple cores ($CPU_1 \ldots CPU_n$) 216 and multiple hardware IP blocks (HW $IP_1 \ldots HW\ IP_m$) 218 (e.g., accelerators). The interconnect framework 214, cores 216 and IP blocks 218 are conventional and known to those of skill in the art, so detailed description is not required for a complete understanding of the present invention. In addition, only those parts of the interconnect framework 214 germane to the present invention are shown and discussed so as not to obfuscate the invention by showing all of the interconnections.

The memory 212 may be a system memory and includes a memory region for storing configuration parameter information for each core 216, IP block 218, interconnect framework 214, and memory 212. In one embodiment, the memory region comprises RAM. The configuration parameter information includes parameter values along with information necessary to access and modify the parameters such as IP configuration space address, IP register offsets, IP configuration parameter bit-field offsets, parameter legal range (i.e., the permitted range for the particular parameter), parameter change step size and parameter change condition. The parameter change condition specifies whether the parameter change is discontinuous, i.e., requires SoC reset or continuous, i.e., does not require SoC reset. Configuration parameter changes that create programming model discontinuity (i.e., the setting can be changed only at system initialization time and run-time change will create functional inconsistencies/failure) or storage discontinuity (i.e., the setting can be changed only at system initialization time and run-time change causes physical storage addressing change leading to functional failures) are candidates for specifying parameter change condition as discontinuous. The ML module 202 fetches the configuration parameters from the memory 212 and saves the fetched configuration parameters in an internal memory of the ML module 202 for fast access thereto.

The debug module 210 is connected to the interconnect framework 214 and is configured to automatically learn the data flow pertaining to a particular use case executing on the SOC 200 using known tracing techniques. The debug module 210 transmits the data flow information for storage in a FLOW_INFO structure 220 of the ML module 202 via a ML_FLOW_INFO interface 222. The debug module 210 also uses known techniques, such as performance counters, to measure system performance. The collected performance metrics are transferred from the debug module 210 to the ML module 202 via a ML_SOC_PERF interface 224.

The ML module 202 configures the SOC 200 to meet desired performance/power targets, which may be programmed or set by a user. The ML module 202 configures the SOC 200 by setting configuration parameters of the cores 216, IP blocks 218, interconnect framework 214 and memory 212. The ML module 202 is activated when the performance of the SOC 200 does not meet the desired performance targets. The ML module 202 tunes the configuration parameters by converting requirements into a reward function, and autonomously cycling through configuration sequences until the desired performance target is achieved.

The SOC 200 avoids configuration settings that lead to severe performance drops by the ML module 202 classifying performance drops below a predetermined threshold as "pathological", recording the pathological configuration settings in a pathological configuration list (i.e., the FORBID list 226 of ML module 202), and checking if new configuration parameters match the configuration settings on the pathological configuration list. If there is a match, then the ML module 202 skips pushing these pathological configuration settings to the cores 216, IP blocks 218, interconnect framework 214, and memory 212 and applies an internally saved large negative reward to determine a new set of configuration parameters.

The SOC 200 also recovers from configuration settings that lead to deadlock like conditions by the ML module 202 classifying performance drops below another predetermined threshold as "deadlock threshold" and recording the deadlock configuration settings in the pathological configuration list 226. If a deadlock does occur, then the reset controller 204 initiates a reset of the SOC 200. The next state of the SOC 200 can be statically defined, e.g., default Power-On-Reset state of the SOC 200, or last known good SOC state or can be computed dynamically based on a ML network computation or the like.

The ML module 202 follows a protocol for synchronized updates to avoid undefined behaviors due to dynamic run-time configuration changes. The ML module 202 requests the quiescent state of the SOC 200 and collects quiescent state information before pushing a new set of configuration parameters to the cores 216, IP blocks 218, interconnect framework 214 and memory 212. If a quiescent state is not attained within a predetermined time, then the reset timer 206 causes the reset controller 204 to issue a SOC reset. Following SOC reset de-assertion, the reset controller 204 initiates a ML boot sequence using the boot module 208 (ML_Boot), which is identical to a regular SoC boot except that software drivers override the default IP configuration settings and substitute them with the new configuration parameters specified in a CFG_ACTION block 228 of the ML module 202. Thus, the ML module 202 follows a protocol for synchronization of pushing configuration updates, which avoids the problem of undefined behavior caused by dynamic runtime configurations changes.

In one embodiment, the ML module 202 has a provision to cycle through SOC reset for exception cases, where the configuration parameters are specified with a discontinuity constraint, which is a parameter whose change introduces programming model or storage discontinuities (as noted above, a discontinuity is a condition that requires SoC reset).

In one embodiment, the ML module 202 receives flow information via the ML_FLOW_INFO interface 222 from the debug module 210, which is flow information related to the compute flows active in the SOC 200. The ML module 202 also receives performance metrics via the ML_SOC_PERF interface 224 from the debug module 210, which indicate whether the SOC 200 is attaining the predetermined performance targets. In one embodiment, the ML module 202 uses a ML_SEQ interface 230 when none of the parameters being updated in the cores 216, IP blocks 218, interconnect framework 214, and memory 212 have a discontinuous change condition constraint. The ML SEQ interface 230 is used primarily to achieve a quiescent state of the cores 216, IP blocks 218, interconnect framework 214, and memory 212 before writing new configuration settings determined by the present iteration of the ML module 202. In a presently preferred embodiment, the ML_SEQ interface 230 comprises two signals, an ML_FREEZE signal and a ML_SYNC_ACK signal. The ML_FREEZE signal and the ML_SYNC_ACK signal are described below.

Figure 6:
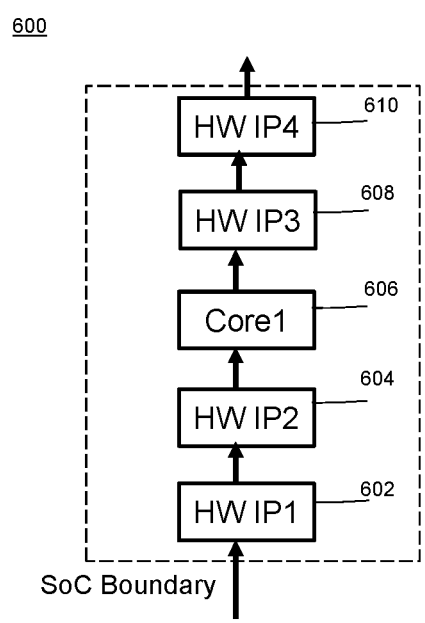
FIG. 6 is simplified diagram of an example dataflow in accordance with an embodiment of the present invention.

The ML module 202 uses the ML_FLOW_INFO interface 222, which contains a data flow, where a data flow defines a unique sequence order of processing of data by the cores 216 and the IP blocks 218, as shown in FIG. 6. The data flow also includes information about all the interconnect elements of the interconnect framework 214, and memory 212 that are accessed while exercising the data flow. The ML module 202 asserts the ML_FREEZE signal to the cores 216 and IP blocks 218 in the sequential order as defined by the data flow in order to request the cores 216 and the IP blocks 218 to discontinue processing of new data. Once a core 216 or IP block 218 has completed its pending jobs, upon receipt of the ML_FREEZE signal, then the core 216 or the IP block 218, as the case may be, will assert the ML_SYNC_ACK to the ML module 202 to indicate that it has reached a quiescent state. The ML module 202 then asserts the ML_FREEZE signal to the next core 216 or IP block 218 as governed by data flow order. Once the ML module 202 receives the ML_SYNC_ACK from all the cores 216 and IP blocks 218 that participate in all dataflows, the ML module 202 asserts the ML_FREEZE signal to the interconnect framework 214 and the memory 212. The ML module 202 receiving the ML_SYNC_ACK from all of the cores 216, IP blocks 218, interconnect framework 214 and memory 212, is indicative of the SOC attaining a quiescent state, at which time the ML module 202 writes updated IP configuration parameters using the ML_CFG_WR interface 232. After the configuration write, the ML module 202 de-asserts the ML_FREEZE signal and in response, the cores 216 and the IP blocks 218 de-assert the ML_SYNC_ACK signal, and the SOC 200 starts executing the use-case in normal run mode.

The ML module 202 also includes a ML_CFG_WR interface 232. Once the ML module 202 receives the ML_SYNC_ACK signals from all of the cores 216, IP blocks 218, interconnect framework 214 and memory 212, which indicates that the SOC 200 has attained a quiescent state, then the ML module 202 updates the configuration parameters using the ML_CFG_WR interface 232. The ML_CFG_WR interface provides the new configuration parameters from the ML module 202, which are stored in the CFG_ACTION block 228.

In one embodiment, the ML module 202 also generates ML_RST signals 234 and provides the ML_RST signals to the reset controller 204 to cause the SOC 200 to be reset in preparation for writing a new set of configuration parameters, where at least one parameter to be updated has a discontinuous change condition constraint, and in response, the reset controller 204 initiates an ML reset sequence to reset the SOC 200 except for the ML module 202. Once the SOC reset is de-asserted, the reset controller 204 initiates a ML boot sequence stored in the ML boot module 208, which is identical to a regular SoC boot, except that software drivers override the default IP configuration settings and substitute them with the new configuration parameters specified in the CFG_ACTION block 228.

The debug module 210 generates data flow information and provides the flow information to the ML module 202 via the ML_FLOW_INFO interface 222, which stores the flow information in the FLOW_INFO block 220. The flow information contains the sequential order in which the various cores 216 and IP blocks 218 process data. The flow information also includes information about the interconnect framework 214 and the memory 212 if they are accessed while executing the various processing operations by the cores 216 and the IP blocks 218. This information is used by the ML module 202 during building of a ML network by considering only those parameters of a subset of the cores 216, IP blocks 218, interconnect framework 214 and memory 212 that participate in the data flow.

The ML_SOC_PERF interface 224 provides performance observation inputs along with their associated target goals to the ML module 202, as previously discussed.

Input observation space as specified by user defined performance metrics (obtained from ML_SOC_PERF interface) and output action space as determined from configurations parameters of all of the cores 216, IP blocks 218, interconnect framework 214 and memory 212, which participate in the dataflow (obtained from ML_FLOW_INFO interface), are used by the ML module 202 to dynamically construct a ML network topology (e.g., number of hidden layers and connectivity between layers). Hence, the ML module 202 builds a ML network with an efficient topology considering the active use-case and user specified performance goals.

Both the performance and computational complexity of artificial neural networks models are dependent on the hyper-parameters (e.g., number of hidden layers, nodes per layer, or choice of activation functions), which can be either optimized manually or through various automatic approaches. The hyper-parameters directly govern the performance, implementation cost, computation cost, memory bandwidth requirement, training time, etc. of the ML network. As is known by those of skill in the art, there are multiple kinds of neural networks, such as fully connected, Convolution Neural Networks (CNNs), recurrent networks, hybrid networks where each layer of neural network can be of a CNN or fully connected, etc. A fully connected neural network has a series of fully connected layers. While structurally simple, determining an optimal fully connected ML network configuration is a difficult task due to the large number of parameters inherent to even the simplest designs. For example, given a simple fully connected neural network with i inputs, a single hidden layer with j nodes, and k nodes in the output layer, $i*j+j*k$ operations must be evaluated at each inference pass and an equal number of weights must be accessed in memory. Another possible neural network used to evaluate same inputs may include a second hidden layer, where the first layer will act as a feature extractor and the second layer will process only the limited number of features generated by the first layer. This alteration allows for the reduction in dimension of the first hidden layer, which reduces the total number of connections to the input layer and hence the computation complexity. Even more complex structures are those of Convolutional Neural Network (CNN), which reduce memory demands at the expense of increased processing demands. CNN parameters also increase the design space dimensionality, e.g., the number of filters to use in each layer, kernel and pooling sizes.

Since the ML network topology and hyper-parameters directly affect training time, as well as computation/memory cost during inference, it is important to build an efficient ML network. Data Flow information of the workload from the debug module 210 is used to identify and select proper hyper-parameters of the ML network.

There can be multiple approaches to build the ML network ranging from using a simple lookup table to select hyper-parameters of the ML network, to complex techniques including transfer learning or using complex automatic approaches like using neural networks to design neural networks. In one embodiment, the present invention uses the lookup table approach. In this approach a lookup table based on a workload characterization is used and built into the ML module 202. When the ML module 202 builds the ML network, it uses information in the lookup table to select neural network hyper-parameters and builds the network accordingly. Table 1 indicates some basic information about the ML neural network.

TABLE 1

| User Specified performance metrics to be achieved | Total Parameters from all IPs used in workload | Hidden Layers in Fully Connected Network | Nodes in each hidden layer |
|---|---|---|---|
| <=2 | <=10 | 3 | 20, 10, 10 |
| <=3 | <=256 | 3 | 200, 50, 50 |
| <=5 | <=500 | 4 | 200, 100, 100, 100 |
| Default | | 5 | 350, 200, 100, 100, 100 |

In an alternative embodiment, the ML neural network is built using Transfer Learning. In this approach, a few pre-trained neural networks are built into the memory of the ML module 202 for known scenarios and use cases. During runtime, based on data flow information from the debug module 210, the ML module 202 selects one of the pre-built networks, for example, based on matching number of cores and accelerators, processing order, etc., for further training and usage.

TABLE 2

| ML Network ID | DataFlow Used for training during SOC design |
|---|---|
| ML Network 1 | A -> B -> C |
| ML Network 2 | B -> D -> B -> E -> F |
| ML Network 3 | A -> B -> C -> D -> E -> F -> G |

Referring to Table 2, if, during runtime, dataflow identified is B->E->F, then the ML module 202 will select ML Network2 given that a subset of the dataflow used by ML Network2 during building exactly matches the new detected dataflow. The selection of ML Networks can be quite complex based on matching a number of different criteria.

In another alternative embodiment, the ML network is built using one of the more complex techniques where the ML Module 202 contains a neural network that uses data flow information from the debug module 210 to build the ML network.

It will be understood by those of skill in the art that the above are just a few techniques to build ML networks, and that other known techniques also could be used. Thus, what is important here is not the exact technique to build the neural network by the ML module 202, but instead, that data flow information provided by the debug module 210 can be used to augment the process of building the ML network.

Figure 3:
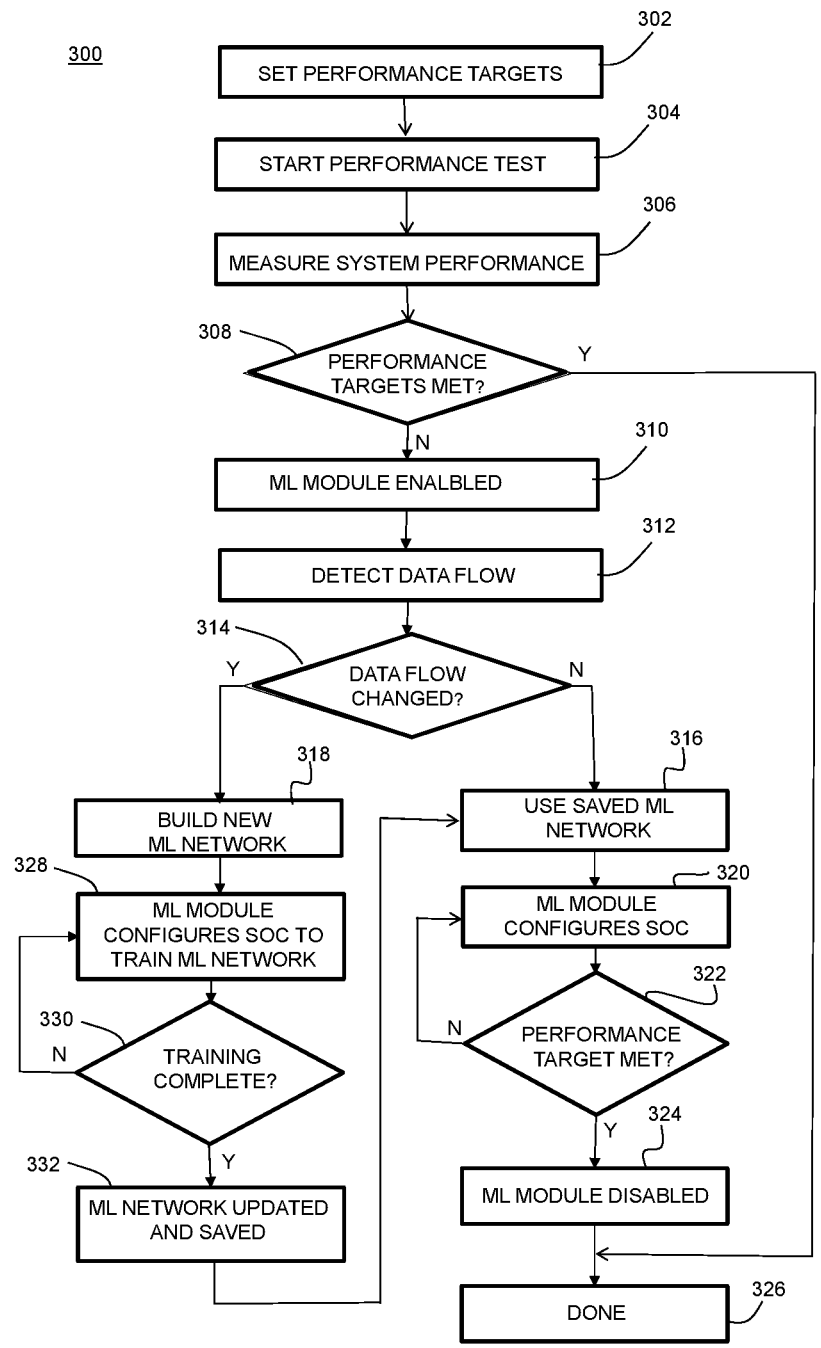
FIG. 3 is a flow chart depicting a method for optimizing a SOC in accordance with an embodiment of the present invention.

FIG. 3 is a flow chart 300 depicting a method of optimizing a SOC, such as the SOC 200, performed by the SOC itself, in accordance with an embodiment of the present invention, where the SOC has multiple cores, multiple hardware accelerators, an interconnection framework, and multiple memories. At step 302, a desired performance target is set for the SOC. The performance target(s) may comprise specific targets such as execution time and power consumption, as is known in the art, and may be input by a user. Performance targets are saved in the debug module 210, and then communicated to the ML Module 202 via the ML_SOC_Perf interface 224. Inside the ML module 202, the performance targets are saved as part of ML State. At step 304, a performance test is executed. The performance test may comprise one or more test scripts that measure the performance of the SOC. The test script(s) may be specific for testing cores, accelerators or memory latency. Such scripts are known by those of skill in the art. It will be understood by those of skill in the art that the first and second steps 302 and 304 may be performed in reverse order. At step 306, the performance of the system is measured, and metrics are determined, such as core execution speed, memory read and write times, and power consumed.

At step 308, the performance of the SOC, as determined by execution of the performance test(s), is compared to the performance targets to determine if the performance targets have been met. If the targets have been met, then the method stops by jumping to step 326. However, if the performance targets are not met, then at step 310 the ML module 202 is enabled so that the ML module 202 can use the ML network to configure the SOC 200 such that the performance targets are met.

At step 312, the ML module 202 uses the debug module 210 to detect the data flow. As discussed above, the data flow is a unique chain of computation operations that are identified by a unique sequence of the cores 216 or IP blocks 218 performing specific operations on a given data buffer as it undergoes transformation in the system 200.

At step 314, the data flow is checked to determine whether or not it is the same as for a prior performance test execution for which the ML network has already been built and trained. If the data flow has changed, that is, a corresponding ML network does not exist, then step 318 is performed next and the ML module 202 builds a new network as described above (and also as described below with reference to FIG. 4). If the data flow detected in step 312 is the same as for a prior performance test execution, then step 316 is performed.

At step 316, ML module 202 uses a saved ML network, i.e., the ML module 202 uses a pre-built and pre-trained ML network that has been saved in the ML module 202 memory (to configure the SOC 200. In one embodiment, the ML module 202 can save multiple trained ML networks corresponding to multiple different use-cases.

At step 320, the ML module 202 configures the various cores 216, HW blocks 218, interconnect framework 214 and memory 212 according to the new parameter set computed.

At step 322, the ML module 202 again measures the performance metrics of the SoC 200 (which it receives from the debug module 210 via the ML_SOC_PERF interface 224). At step 324, since the performance targets have been achieved, then the ML module 202 is de-activated.

Referring back to step 314, if the data flow has changed, then step 318 is performed where the ML Module 202 first builds the ML network as described above.

At step 328, the ML module 202 trains the newly built ML network. During each training step, the ML module 202 configures the SoC 200 and updates the ML network according to the performance metrics provided to the ML module 202 by the debug module 210 via the ML_SOC_PERF interface 224. These training steps are repeated until the training is deemed to be complete, which is determined at step 330.

At step 330, the ML module 202 checks if the training is complete using a pre-defined metric e.g., either a fixed number of training steps have been completed, sufficient random configurations have been tested or ML network updates are almost negligible, etc. If training is not yet complete, then the ML module 202 again performs step 328 to execute a next training step. On the other hand, if the training is found to be completed at step 330, then the ML module 202 saves the trained ML network in its memory at step 332 and then, once the ML network has been built, trained and saved, the ML module 202 goes to step 316.

Figure 4:
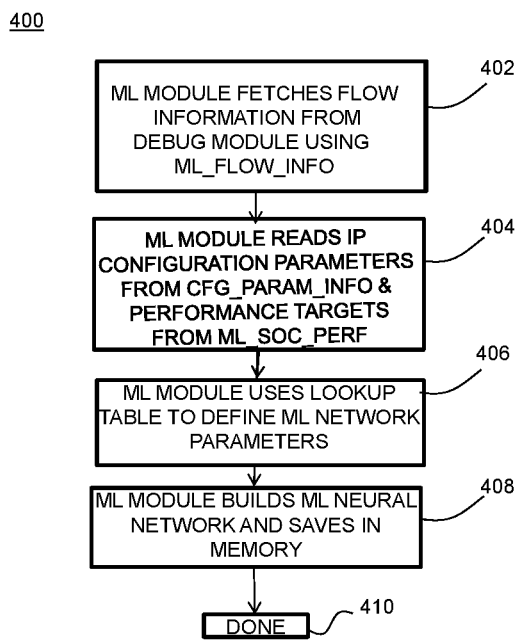
FIG. 4 is a flow chart depicting a method for building a ML network by the ML module in accordance with an embodiment of the present invention.

FIG. 4 is a flow chart depicting a method 400 for building a ML network by the ML module 202, in accordance with an embodiment of the present invention. FIG. 4 provides detailed information regarding step 318 of FIG. 3. At step 402, the ML module 202 fetches data flow information using ML_FLOW_INFO from the debug module 210. At step 404, the ML module 202 fetches the configuration parameters for the cores 216, the IP blocks 218, the interconnect framework 214 and memory 212 from CFG_PARAM_INFO in the memory 212. The ML module 202 also fetches user defined performance metrics using the ML_SOC_PERF interface 224. At step 406, the ML module 202 uses a lookup table to define ML network parameters, e.g., the number of hidden layers in the ML network, numbers of neurons in each layer, learning rate of model, etc. As discussed above, the ML module 202 can use different approaches to build the ML network, such as using a lookup table to define the topology and hyper-parameters of the ML network and build the ML network. The lookup table can be created based on data gathered from experiments for various known use-cases and saved as ML module internal memory. The ML module 202 can also utilize advanced approaches like Machine Learning (ML) techniques to build the ML network, where the ML module sequences through various different ML network topologies and hyper-parameters to identify the best performing ML network for the use case. At step 408, the ML module 202 uses the ML network parameters to build a ML neural network and saves the ML neural network in local ML memory for fast access. The ML memory is an internal memory of the ML module 202.

Figure 5:
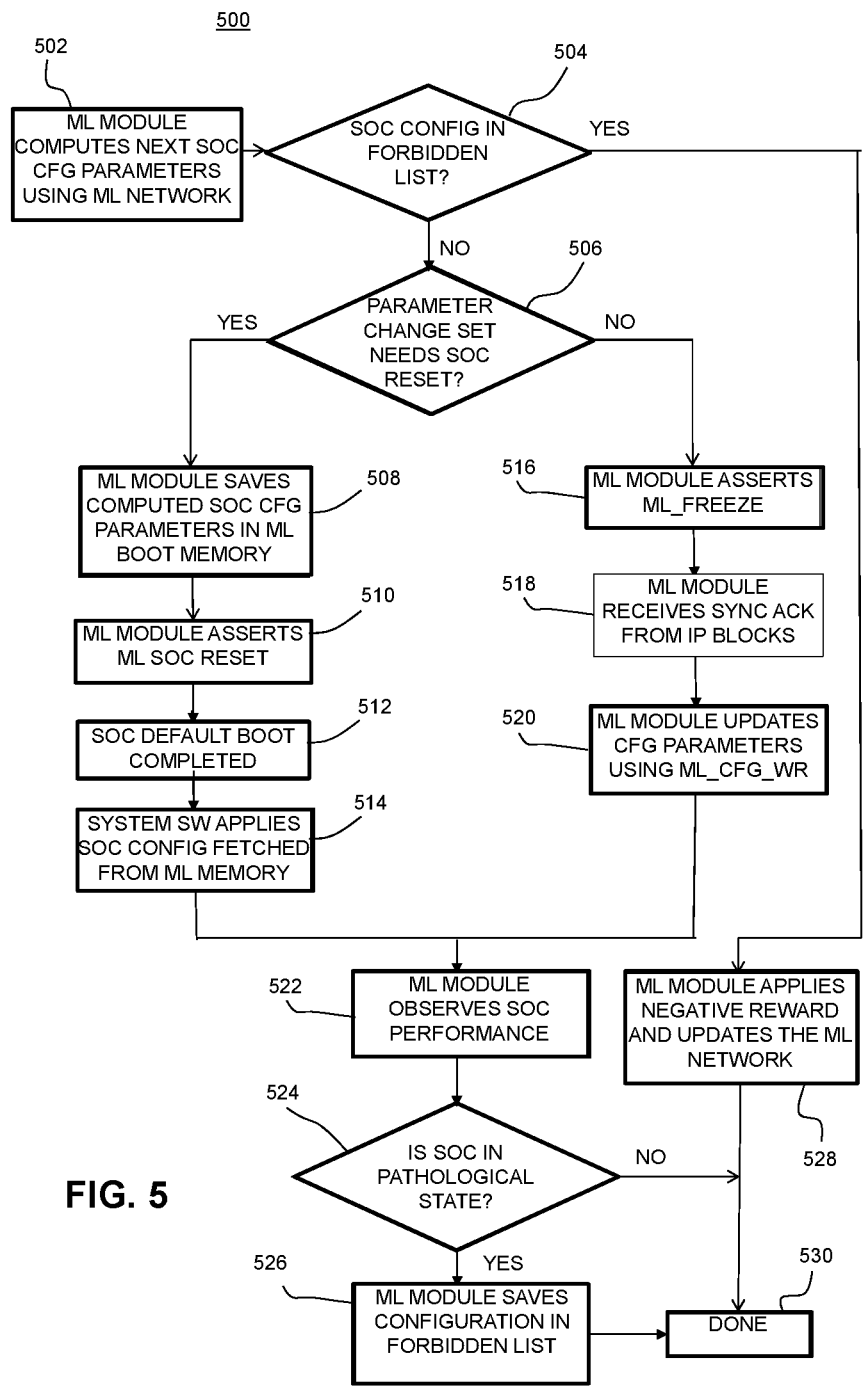
FIG. 5 is a flow chart depicting a method for configuring a SOC by a ML module in accordance with an embodiment of the present invention.

FIG. 5 is a flow chart depicting a method 500 for configuring the SOC 200 by the ML module 202, in accordance with an embodiment of the present invention. FIG. 5 provides detailed information for the step 320 of FIG. 3. At step 502, the ML module 202 uses the ML_SOC_PERF interface to measure the current SOC performance metrics and maps the observation to a ML network state information. Then the ML module uses the ML network and its current state to compute the next action to be taken to achieve the performance target. This computed action is mapped by the ML network to output the next set of SOC configuration parameters.

At step 504, the ML module 202 checks whether the next configuration parameters are in the pathological parameters list, which indicates that the parameters cause the SOC to perform below a predetermined threshold. If the next set of configuration parameters are not in the pathological parameters list, then at step 506, the ML module 202 checks if the next set of configuration parameters require the SOC 200 to be reset. The parameters that lead to functional or storage discontinuity require the SOC to be reset, e.g., memory controller chip-select interleaving, modification of address hashing parameters, etc.

If the SOC 200 needs to be reset, then at step 508, the ML module 202 saves the computed next SOC configuration parameters in an internal ML boot memory and at step 510 the reset controller 206 initiates a ML boot sequence. At step 512, a SOC default boot is completed, and then at step 514, the computed next configuration parameters saved to the ML boot memory are read and used to set the SOC configuration. Note, in a normal boot sequence, default SOC configuration parameters are used, whereas when the ML module 202 is enabled, the ML boot sequence uses stored next configuration parameters instead of the default configuration parameters.

If at step 506 it is determined that the SOC 200 does not need to be reset, then step 516 is executed. At step 516, the ML module 202 asserts an ML_freeze signal (part of ML_SEQ 230) to the cores 216, IP blocks 218, interconnect framework 214, and memory 212. At step 518, the ML module 202 receives a ML_SYNC_ACK signal from all the cores 216 and IP blocks 218, interconnect framework 214 and memory 212 and then at step 520, the ML module 202 updates the SOC configuration parameters of the cores 216, IP blocks 218, interconnect framework 214, memory 212 via the ML_CFG_WR interface.

Step 522 is performed after either of steps 514 or 520. At step 522, the ML module 202 observes the performance of the SOC 200 using the ML_SOC_PERF signal from the debug module 210. At step 524, the ML module 202 determines whether the SOC 200 is in a pathological state, i.e., the performance has dropped below a predetermined threshold level. If yes, the performance has dropped so low, then step 526 is performed. At step 526, the configuration parameters that caused the pathological performance are saved in the pathological configurations list so that such settings can be avoided in future iterations. If the SOC performance is not pathological at step 524, then the iteration is done (step 530). If the performance was pathological and the setting has been saved (step 526), after that, the iteration is done (step 530).

Going back to steps 502 and 504, if the configuration settings were on the pathological configuration settings list, then the routine proceeds to step 528. At step 528, the ML module 202 applies a large negative reward and updates the ML network. The next state of the SOC 200 can be statically defined, e.g., default Power-On-Reset state of the SOC 200, or last known good SOC state or can be computed dynamically based on a ML network computation or the like.

FIG. 6 shows an example dataflow 600, where the dataflow comprises of a chain of computation operations that are identified by a sequence of hardware or software performing specific operations on a given data buffer. As shown in FIG. 6, a data buffer is processed by various engines in the following order: first the buffer is processed by two different IP blocks called HW IP1 and HW IP2 at 602 and 604, followed by a core at 606, and finally by a two more IP blocks HW IP3 and HW IP4 at 608 and 610.

As will now be apparent, the present invention provides a self-optimizing, multi-core SOC that uses machine learning (ML) technology to configure all the various internal hardware blocks autonomously to achieve a desired application performance/latency/targets. The SOC is able to recover from hangs caused when testing various configuration settings. There also is no need to understand various runtime configurations of each hardware block.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein.

Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the application as claimed. Also, where a method or process is described that includes a plurality of steps, unless obvious or explicitly stated, the steps may be performed out of order.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, the claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A self-optimizing System on a Chip (SOC), comprising:
   multiple cores, multiple hardware accelerators, multiple memories, and an interconnection framework that couples the cores, the accelerators and the memories to permit programs to be executed by the SOC;
   a SOC reset controller configured to reset the SOC;
   a machine learning (ML) module in communication with the multiple cores, the multiple hardware accelerators, the interconnection framework, the multiple memories and the SOC reset controller that adjusts configuration parameters of the cores, the hardware accelerators, interconnect elements and the memories autonomously until a desired performance target is achieved, wherein the ML module adjusts the configuration parameters to meet the desired performance target by tuning the configuration parameters and autonomously cycling through configuration training sequences until the desired performance target is achieved, wherein the configuration parameters include one or more of configuration space address, register offset, configuration parameter bit-field offset, parameter legal range, parameter change step size and parameter change condition;
   a pathological configuration list, generated by the ML module, comprising a list of configuration parameter settings that lead to severe performance drops, by classifying performance drops below a predetermined threshold value as pathological,
   wherein the ML module checks if new configuration parameters match a configuration setting in the pathological configuration list and if there is a match, then the ML module does not run the configuration training sequences using said configuration parameters and generates a next new configuration parameters,
   wherein the ML module is configured to provide a protocol for synchronized updates of the configuration parameters to avoid undefined behaviors due to dynamic runtime configuration changes, wherein the protocol includes the ML module receiving confirmation of quiescent state before pushing new configuration parameters, and wherein the SOC reset controller includes a reset timer that causes the SoC reset controller to issue a reset of the SOC if the quiescent state is not attained within a predetermined quiescent time value.

2. The self-optimizing SOC of claim 1, further comprising:
a debug module that generates compute flow information related to compute flows active in the SOC, and
wherein the ML module fetches the compute flow information from the debug module using a ML_FLOW_INFO interface.

3. The self-optimizing SOC of claim 2, wherein the ML module includes a ML SOC PERF interface for communicating with the debug module to performance metrics related to the desired performance target and the current SoC state.

4. The self-optimizing SOC of claim 3, wherein the ML module uses the compute flow information and the performance metrics to build a ML Network dynamically.

5. The self-optimizing SOC of claim 1, wherein the ML module fetches the configuration parameters from one of the memories and saves the fetched configuration parameters in an internal memory of the ML module for fast access thereto.

6. The self-optimizing SOC of claim 1, wherein the ML module includes a ML_SEQ interface that includes ML_FREEZE signals that are asserted by the ML module in an order specified by a data flow to the cores and the accelerators to request the cores and the accelerators to discontinue processing of new data.

7. A self-optimizing System on a Chip (SOC), comprising:
multiple cores, multiple hardware accelerators, multiple memories, and an interconnection framework that couples the cores, the accelerators and the memories to permit programs to be executed by the SOC;
a SOC reset controller configured to reset the SOC;
a machine learning (ML) module in communication with the multiple cores, the multiple hardware accelerators, the interconnection framework, the multiple memories and the SOC reset controller that adjusts configuration parameters of the cores, the hardware accelerators, interconnect elements and the memories autonomously until a desired performance target is achieved, wherein the ML module adjusts the configuration parameters to meet the desired performance target by tuning the configuration parameters and autonomously cycling through configuration training sequences until the desired performance target is achieved;
a pathological configuration list, generated by the ML module, comprising a list of configuration parameter settings that lead to severe performance drops, by classifying performance drops below a predetermined threshold value as pathological,
wherein the ML module checks if new configuration parameters match a configuration setting in the pathological configuration list and if there is a match, then the ML module does not run the configuration training sequences using said configuration parameters and generates a next new configuration parameters,
wherein the ML module includes a ML_SEQ interface that includes ML_FREEZE signals that are asserted by the ML module in an order specified by a data flow to the cores and the accelerators to request the cores and the accelerators to discontinue processing of new data, and
wherein the ML_SEQ interface further includes ML_SYNC_ACK signals, and once one of the cores has drained pending jobs upon receipt of the ML_FREEZE signals, said core asserts the ML_SYNC_ACK signals to indicate that said core has reached a quiescent state.

8. The self-optimizing SOC of claim 7, wherein the ML module further includes a ML_CFG WR interface, and wherein once the ML module receives the ML_SYNC_ACK signals from all of the cores, accelerators, interconnect framework and memories, which indicates that the SOC has attained a quiescent state, the ML module generates a new set of configuration parameters using the ML_CFG_WR interface.

9. The self-optimizing SOC of claim 1, wherein the ML module further includes a ML module CFG_ACTION module containing new configuration parameters.

10. The self-optimizing SOC of claim 1, wherein the ML module further comprises a ML_RST interface that includes a ML_RST signal that is asserted by the ML module to the SOC reset controller to reset the SOC, in preparation for writing a new set of configuration parameters, where at least one parameter to be updated has a discontinuous change condition constraint, and in response, the SOC reset controller initiates a ML reset sequence to reset all of the cores, accelerators, interconnect framework, and memories and wherein the SoC reset controller initiates a ML boot sequence that uses the new configuration parameters instead of default configuration parameters.

11. A method of configuring a System on a chip (SOC) to perform at a predetermined performance level, wherein the SOC has multiple cores, multiple hardware accelerators, multiple memories and an interconnection framework therefor, the method comprising:
setting a desired performance target for the SOC;
executing a performance test on the SOC by a debug module of the SOC;
measuring the performance of the SOC as determined by an iteration of the performance test against the desired performance target;
enabling a Machine Learning (ML) module when the performance does not meet the desired performance target, wherein the ML module configures the SOC to meet the desired performance target by tuning configuration parameters of at least the cores, the accelerators, the interconnect framework and the memories by autonomously cycling through configuration training sequences until the desired performance target is achieved;
classifying performance drops below a first predetermined performance threshold as pathological and saving the configuration parameters thereof to a pathological configuration list;
classifying performance drops below a second predetermined performance threshold as deadlock and saving the configuration parameters thereof to a pathological configuration list;
avoiding configuration settings that lead to performance drops below the first predetermined threshold by checking if new configuration parameters match one of the configuration settings stored in the pathological configuration list;
recovering from SOC configuration settings that lead to performance drops below the second predetermined threshold or deadlock like conditions by applying a SOC reset; and
providing a protocol, by a machine learning (ML) module, for synchronized configuration parameter updates to avoid undefined behaviors due to dynamic runtime configuration changes, wherein the protocol includes the ML module receiving confirmation of quiescent state before pushing new configuration parameters, wherein the reset comprises a ML reset in which a boot sequence of the SOC uses configuration parameters generated by the ML module instead of default configuration parameters.

12. The method of claim 11, wherein a reset timer causes a SOC reset controller to issue a reset if the quiescent state is not attained within a predetermined time.

13. The method of claim 11, further comprising:

fetching data flow and communication flow information and the configuration parameters to define ML network parameters to build a ML network when dataflow is changed, and wherein the ML module uses the ML network to compute new SOC configuration parameters when the dataflow is changed and uses a saved, original ML network when the dataflow is not changed.

\* \* \* \* \*